Nov. 13, 1962 M. H. HUBER 3,063,414
TRANSPORTATION CARRIER FOR ANIMALS
Filed Oct. 10, 1960
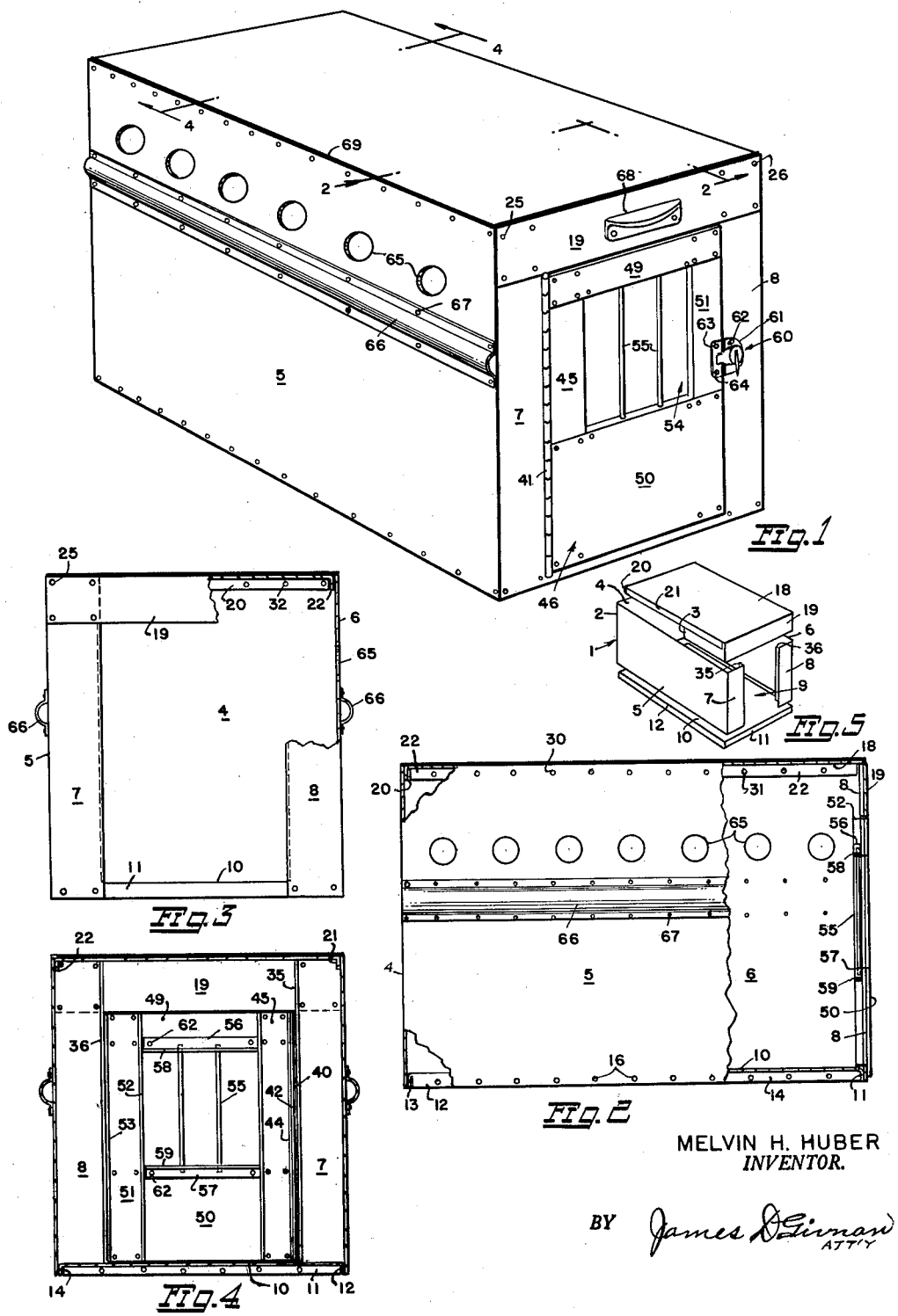
MELVIN H. HUBER
INVENTOR.
BY James D. Girman
ATT'Y

United States Patent Office 3,063,414
Patented Nov. 13, 1962

3,063,414
TRANSPORTATION CARRIER FOR ANIMALS
Melvin H. Huber, 7120 SE. 68th Ave., Portland 15, Oreg.
Filed Oct. 10, 1960, Ser. No. 61,753
1 Claim. (Cl. 119—19)

This invention relates to carriers for transporting animals such as dogs, cats, and other smaller animals.

Among the objects of the invention is the provision of a novel carrier in the form of a crate or container so constructed and arranged as to protect the animal confined therein against bodily injury and to maintain the animal secure from molestation or the attentions of unauthorized persons. Also to provide positive protection against the escape of the animal.

Another object resides in the novel construction of the container for temporarily housing an animal such as during shipment or transporting from place to place, and permitting such an animal maximum comfort during its period of confinement.

A further object is the provision of a container of this character which is of rigid metal construction throughout, yet is sufficiently light to enable it to be carried about and readily stacked.

A still further object is a provision of means for providing adequate ventilation and for preventing close contact of the sides of the container containing the ventilating means with adjacent containers or other objects.

The foregoing and other objects and advantages which will become subsequently apparent reside in the details of construction and operation as more fully hereinafter described and claimed, reference being had to the accompanying drawing forming a part hereof and in which:

FIGURE 1 is a perspective view of an animal carrier as made in accordance with my invention.

FIGURE 2 is a side elevational view, partly in section as taken approximately along the line 2—2 of FIGURE 1 and with fragments broken away for clearness of illustration.

FIGURE 3 is a front elevational view of FIGURE 1, with the door removed and fragments similarly broken away.

FIGURE 4 is a sectional end elevational view taken along the line 4—4 of FIGURE 1.

FIGURE 5 is a diagrammatic composite view showing the three main structural components of the container and the manner in which they are assembled.

With continuing reference to the drawing wherein like references of character designate like parts reference numeral 1 indicates generally the main body or wall structure of the container which is made of a single length of sheet metal bent as at 2 and 3 to provide a rear wall 4 and side walls 5 and 6 which are bent inwardly as at 7 and 8 at their forward ends to provide an access opening 9.

In assembling the container the main body 1 is placed downwardly over a base 10, made of a single sheet of metal, provided with downwardly extending flanges 11, 12, 13, and 14 and to these flanges the bottom of the housing is secured by rivets 16. A top wall 18, also made of a single sheet of metal is flanged downwardly at its front and rear ends as at 19 and 20 and along both of its sides as at 21 and 22. The front flange 19 overlies and is secured by rivets 25 and 26 respectively to the top ends of the front wall portions 7 and 8. The flanges 21 and 22 are secured by rivets 30 and 31 to the side walls 5 and 6, and the flange 20 is secured by rivets 32 to the rear wall 4.

The inner vertical edges of the front wall portions 7 and 8 are flanged rearwardly as at 35 and 36, respectively, and to the flange 35 I secure by any suitable means, such as flush head sheet metal screws or the like, not shown, one hinge plate 40 of a hinge 41 whose companion hinge plate 42 is similarly secured to one side flange 44 of a channel frame member 45 of a door indicated generally at 46. This channel member 45 is connected by top and bottom plates 49 and 50 to a companion channel frame member 51 flanged as at 52 and 53. The opposed flanges of the channel members 45 and 51 and the plates 49 and 50 define an opening 54 in the door protected by any desired number of rigid metal rods 55 secured at their top and bottom ends within bars 56 and 57 rivetted as at 62 to angle sections 58 and 59 secured to the top and bottom plates 49 and 50 by the same rivets. The top plate 49 is of the same thickness as that of the front flange 19 of the top wall 18, and the bottom plate 50 extends slightly below the floor 10 to overlap the flange 11 at the forward end thereof which provides a limit stop for the closing of the door. Any suitable latching or locking mechanism, indicated generally at 60, is provided with one of its parts 61 rivetted as at 62 to the front wall portion 8 and with its other part 63 rivetted as at 64 to the channel frame member 51.

The side walls 5 and 6 are provided with any desired number of spaced apart ventilating openings 65 and to protect these openings from being closed off by placement of the sides of the container against adjacent containers or other objects. I provide bumpers or spacers 66 of semi-tubular form rivetted as at 67 to the side walls 5 and 6 below the ventilating openings therethrough.

For convenience in handling the carrier I provide a hand grip 68 centrally near the top of its front and rear walls.

When the carrier is to be used as a stand for displaying a show animal I provide the top wall 18 with a rubber mat 69 which is conducive to a proper stance and prevents accidental slippage.

While I have shown a particular form of embodiment of my invention, I am aware that many minor changes therein will readily suggest themselves to others skilled in the art without departing from the spirit and scope of the invention. Having thus described my invention what I claim as new and desire to protect by Letters Patent is:

A carrier for confining and transporting an animal, comprising a container consisting of a unitary sheet of metal having bends along four vertical fold lines to provide one piece vertical side walls, a vertical rear wall and vertical front wall portions, a base consisting of a unitary sheet of metal to provide an unobstructed flat top surface and a downward bend across its front and rear ends and along both of its sides to provide front, rear and side flanges all extending downwardly to an equal extent, a top wall consisting of a unitary sheet of metal having downwardly bends across its front and rear ends and along both of its sides to provide downwardly extending front rear and side flanges with said front flange extending downwardly to a greater extent than said side and rear flanges, said vertical front wall portions secured at their top ends to said front flanges of said top wall, the rear flange of the top secured to the top edge of said rear wall and the side flanges of the top sesured to the top edges of said side walls, the bottom edges of said rear side and front wall portions secured respectively to the rear side and front flanges of said base, said front of the top, the opposing edges of said front wall and the front flange of said base defining an access opening, a door hingedly attached to the inner edge of one of said front wall portions and having its bottom edge projecting below the top surface of said base and abutting said front flange of the base when the door is closed, a two-piece cooperating latching means having one piece secured to one of said front wall portions and the other to the adjacent edge of said door, each of said side walls having a series of forwardly and rearwardly aligned ventilating openings therein, means carried by said side walls of said container for preventing their close contact with the sides of adjacent containers, said means comprising semi-tubular means secured to and extending throughout the length of each side wall below said ventilating openings therein.

References Cited in the file of this patent
UNITED STATES PATENTS

| | | |
|---|---|---|
| 1,664,308 | Miller | Mar. 27, 1928 |
| 1,734,481 | Gorsuch | Nov. 5, 1929 |
| 2,678,628 | Williams | May 18, 1954 |